United States Patent
Plihal et al.

(10) Patent No.: US 11,676,264 B2
(45) Date of Patent: Jun. 13, 2023

(54) SYSTEM AND METHOD FOR DETERMINING DEFECTS USING PHYSICS-BASED IMAGE PERTURBATIONS

(71) Applicant: KLA Corporation, Milpitas, CA (US)

(72) Inventors: Martin Plihal, Pleasanton, CA (US); Saravanan Paramasivam, Chennai (IN); Jacob George, Cochin (IN); Niveditha Lakshmi Narasimhan, Chennai (IN); Sairam Ravu, Chennai (IN); Somesh Challapalli, Hyderabad (IN); Prasanti Uppaluri, Saratoga, CA (US)

(73) Assignee: KLA Corporation, Milpitas, CA (US)

( * ) Notice: Subject to any disclaimer, the term of this patent is extended or adjusted under 35 U.S.C. 154(b) by 213 days.

(21) Appl. No.: 16/935,159

(22) Filed: Jul. 21, 2020

(65) Prior Publication Data
US 2021/0027445 A1  Jan. 28, 2021

Related U.S. Application Data (60) Provisional application No. 62/898,761, filed on Sep. 11, 2019.

(51) Int. Cl.
*G06T 7/00* (2017.01)
*G06N 20/00* (2019.01)
(Continued)

(52) U.S. Cl.
CPC ............ *G06T 7/001* (2013.01); *G06F 18/214* (2023.01); *G06F 18/217* (2023.01); *G06N 20/00* (2019.01);
(Continued)

(58) Field of Classification Search
CPC ................ G06K 9/6262; G06K 9/6274; G06T 2207/10061; G06T 2207/20081;
(Continued)

(56) References Cited

U.S. PATENT DOCUMENTS

2008/0260261 A1* 10/2008 Li ..................... G06V 10/443
382/209
2016/0097513 A1*  4/2016 Ryu ..................... H01S 3/0071
250/503.1
(Continued)

FOREIGN PATENT DOCUMENTS

WO         2016090044 A1     6/2016

OTHER PUBLICATIONS

Guo, S. M. et al., "Inline Inspection Improvement using Machine Learning on Broadband Plasma Inspector in an Advanced Foundry Fab", IEEE Xplore, ASMC 2019, 6 pages.
(Continued)

*Primary Examiner* — Quan M Hua
(74) *Attorney, Agent, or Firm* — Suiter Swantz pc llo (57) ABSTRACT

A system for characterizing a specimen is disclosed. In one embodiment, the system includes a characterization sub-system configured to acquire one or more images a specimen, and a controller communicatively coupled to the characterization sub-system. The controller may be configured to: receive from the characterization sub-system one or more training images of one or more defects of a training specimen; generate one or more augmented images of the one or more defects of the training specimen; generate a machine learning classifier based on the one or more augmented images of the one or more defects of the training specimen; receive from the characterization sub-system one or more target images of one or more target features of a target specimen; and determine one or more defects of the
(Continued)

one or more target features with the machine learning classifier.

24 Claims, 5 Drawing Sheets

(51) Int. Cl.
*G06F 18/214* (2023.01)
*G06F 18/21* (2023.01)
*G06V 20/69* (2022.01)

(52) U.S. Cl.
CPC .... *G06V 20/69* (2022.01); *G06T 2207/20081* (2013.01); *G06T 2207/20084* (2013.01); *G06T 2207/30148* (2013.01)

(58) Field of Classification Search
CPC . G06T 2207/20084; G06T 2207/30148; G06T 7/0002; G06V 10/82; G06V 2201/06; G01N 21/9501; G01N 2021/8854; G01N 2021/8883; G01N 21/8851; G01N 2201/06113; G01N 2201/12; G01N 33/5014; G01N 33/5073; G01N 2021/0137; G01N 2021/8809; G01N 21/8806; G01N 2201/061; G01N 2201/0683; G01N 23/20008; G01N 33/6848; G01N 23/2258; G01N 33/5008; G01N 33/6812; G01N 33/6815
See application file for complete search history.

(56) References Cited

U.S. PATENT DOCUMENTS

| | | | |
|---|---|---|---|
| 2017/0082555 A1* | 3/2017 | He | G01N 21/8851 |
| 2017/0364798 A1* | 12/2017 | Karlinsky | G06N 3/08 |
| 2018/0253866 A1* | 9/2018 | Jain | G06N 7/01 |
| 2018/0330493 A1 | 11/2018 | Milligan | |
| 2019/0155164 A1 | 5/2019 | Chen et al. | |
| 2019/0188840 A1 | 6/2019 | Kwon et al. | |
| 2019/0251401 A1* | 8/2019 | Shechtman | G06V 20/20 |

OTHER PUBLICATIONS

PCT International Search Report and Written Opinion for International Application No. PCT/US2020/043162 dated Nov. 9, 2020, 8 pages.

* cited by examiner

SYSTEM AND METHOD FOR DETERMINING DEFECTS USING PHYSICS-BASED IMAGE PERTURBATIONS

CROSS-REFERENCE TO RELATED APPLICATION

The present application claims priority to India Provisional Patent Application No. 201941030213, filed Jul. 26, 2019, entitled TRAINING SET AUGMENTATION USING PHYSICS-BASED IMAGE PERTURBATIONS, naming Martin Plihal, Saravanan Paramasivam, Jacob George, Niveditha Lakshmi Narasimhan, Sairam Ravu, Somesh Challapalli, and Prasanti Uppaluri as inventors, which is incorporated herein by reference in the entirety, and U.S. Provisional Patent Application No. 62/898,761, filed Sep. 11, 2019, entitled TRAINING SET AUGMENTATION USING PHYSICS-BASED IMAGE PERTURBATIONS, naming Martin Plihal, Saravanan Paramasivam, Jacob George, Niveditha Lakshmi Narasimhan, Sairam Ravu, Somesh Challapalli, and Prasanti Uppaluri as inventors, which is incorporated herein by reference in the entirety.

TECHNICAL FIELD

The present invention generally relates to the fields of specimen inspection and, more particularly, to a system and method for determining defects using physics-based image perturbations.

BACKGROUND

Demand for electronic logic and memory devices with ever-smaller footprints and features present a wide range of manufacturing challenges beyond fabrication at a desired scale. In the context of semiconductor fabrication, identifying, predicting, and removing defects from semiconductor devices is an important step in improving throughput and yield. One of the primary challenges in identifying defects is the inability to determine defects accurately.

Traditional techniques used to determine the relative location, type, and structure of defects involve the use of simulations and machine-learning algorithms. For example, in situations where a process engineer knows an approximate location, type, and rough structure of a probable defect, simulations may be used to simulate scanning electron microscopy (SEM) images of the defect. Similarly, machine-learning algorithms may be employed to process one or more images of a wafer and differentiate between wafer defect types. However, machine-learning algorithms require data in amounts sufficient to ensure that the identification and determination of wafer defects is reliable for use in fabrication recipe tuning. The need for sufficient data poses a challenge for using machine-learning algorithms to determine defects of wafers generally having a small number of defects or wafers for which defects occur infrequently.

Therefore, it would be desirable to provide a system and method that cure one or more of the shortfalls of the previous approaches identified above.

SUMMARY

A system for characterizing a specimen is disclosed. In one embodiment, the system includes a controller having one or more processors configured to execute a set of program instructions stored in memory. In one embodiment, the set of program instructions is configured to cause the one or more processors to: receive one or more training images of one or more defects of a training specimen; generate one or more augmented images of the one or more defects of the training specimen; generate a machine learning classifier based on the one or more augmented images of the one or more defects of the training specimen; receive one or more target images of one or more target features of a target specimen; and determine one or more defects of the one or more target features with the machine learning classifier.

A system for characterizing a specimen is disclosed. In one embodiment, the system includes a characterization sub-system configured to acquire one or more images of a specimen. In another embodiment, the system includes a controller having one or more processors configured to execute a set of program instructions stored in memory. In one embodiment, the set of program instructions configured to cause the one or more processors to: receive from the characterization sub-system one or more training images of one or more defects of a training specimen; generate one or more augmented images of the one or more defects of the training specimen; generate a machine learning classifier based on the one or more augmented images of the one or more defects of the training specimen; receive from the characterization sub-system one or more target images of one or more target features of a target specimen; and determine one or more defects of the one or more target features with the machine learning classifier.

A method of characterizing a specimen is disclosed. In one embodiment, the method includes receiving one or more training images of one or more defects of a training specimen. In another embodiment, the method includes generating one or more augmented images of the one or more defects of the training specimen. In another embodiment, the method includes generating a machine learning classifier based on the one or more augmented images of the one or more defects of the training specimen. In another embodiment, the method includes receiving one or more target images of one or more target features of a target specimen. In another method, the method includes determining one or more defects of the one or more target features with the machine learning classifier.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Embodiments of the present disclosure are directed to a system and method for determining defects using physics-based image perturbations and machine-learning techniques (e.g., deep learning predictive models). Additional embodiments of the present disclosure are directed to systems and methods for generating augmented scanning electron microscopy (SEM) images and/or augmented optical images based on machine learning techniques.

It is contemplated herein that embodiments of the present disclosure may enable faster, more efficient identification of specimen defects throughout a fabrication process, thereby improving throughput and yield.

Figure 1:
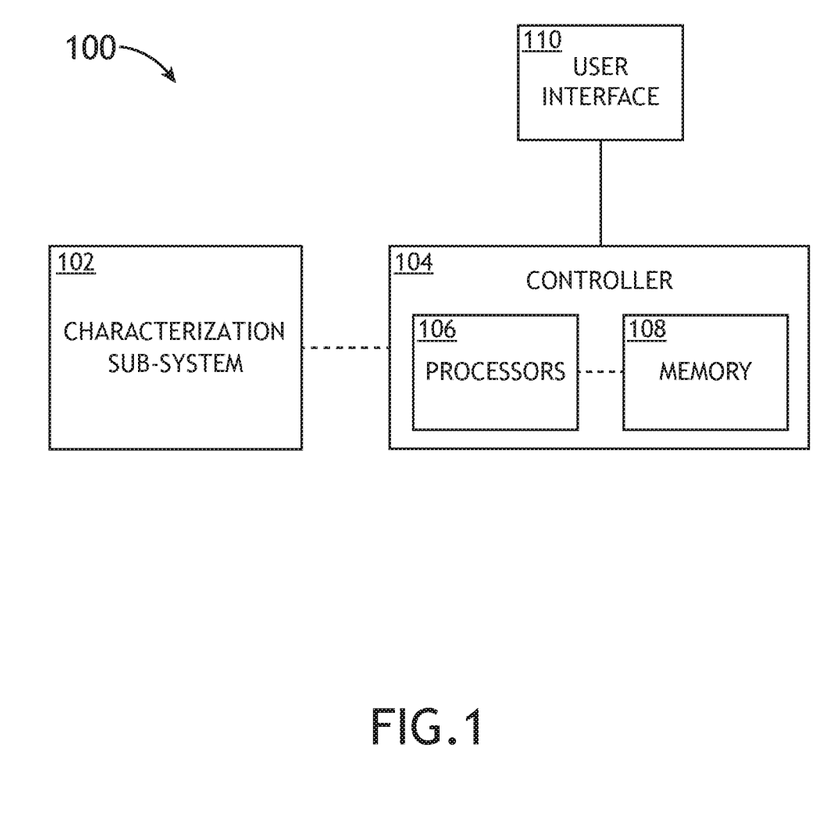
FIG. 1 illustrates a system for determining defects using physics-based image perturbations, in accordance with one or more embodiments of the present disclosure.

FIG. 1 illustrates a system 100 for characterizing a specimen, in accordance with one or more embodiments of the present disclosure. In particular, FIG. 1 illustrates a system 100 for determining defects using physics-based image perturbations. The system 100 may include, but is not limited to, one or more characterization sub-systems 102. The system 100 may additionally include, but is not limited to, a controller 104 including one or more processors 106, a memory 108, and a user interface 110.

The characterization sub-system 102 may include any characterization sub-system 102 known in the art including, but not limited to, an inspection sub-system. For example, the characterization sub-system 102 may include, but is not limited to, an optical-based inspection system, a charged particle-based inspection system, and the like. For instance, the characterization sub-system 102 may include a broadband inspection system (e.g., broadband plasma inspection system) or a narrowband inspection system (e.g., laser-based inspection system). In another instance, the characterization sub-system 102 may include a scanning electron microscopy (SEM) inspection system.

In one embodiment, the controller 104 is communicatively coupled to the one or more characterization sub-systems 102. In this regard, the one or more processors 106 of the controller 104 may be configured to generate one or more control signals configured to adjust one or more characteristics of the inspection sub-system 102.

In one embodiment, the controller 104 is configured to receive one or more training images of one or more defects of a specimen. For example, the controller 104 may be configured to receive the one or more training images from the inspection sub-system 102.

In another embodiment, the controller 104 is configured to generate one or more augmented images of the one or more defects of a specimen. For example, the controller 104 may be configured to generate one or more augmented images by introducing one or more physical perturbations (e.g., system noise) to the one or more training images. As an additional example, the controller 104 may be configured to determine one or more features of the specimen indicative of one or more defects of the specimen based on the one or more perturbed images, extract the one or more features of the specimen indicative of the one or more defects, and generate one or more replicas of the one or more defects.

In another embodiment, the controller 104 may be configured to generate a machine learning classifier based on the one or more augmented images. For example, the controller 104 may be configured to use as inputs to the machine learning classifier the one or more augmented images and/or the one or more replicas of the defects.

In another embodiment, the controller 104 may be configured to receive one or more target images of one or more target features of a target specimen. For example, the controller 104 may be configured to receive the one or more target images of the one or more target features from the inspection sub-system 102.

In another embodiment, the controller 104 may be configured to determine one or more defects of the one or more target features based on the one or more target images. For example, the controller 104 may determine the one or more defects using the machine learning classifier.

Figure 2A:
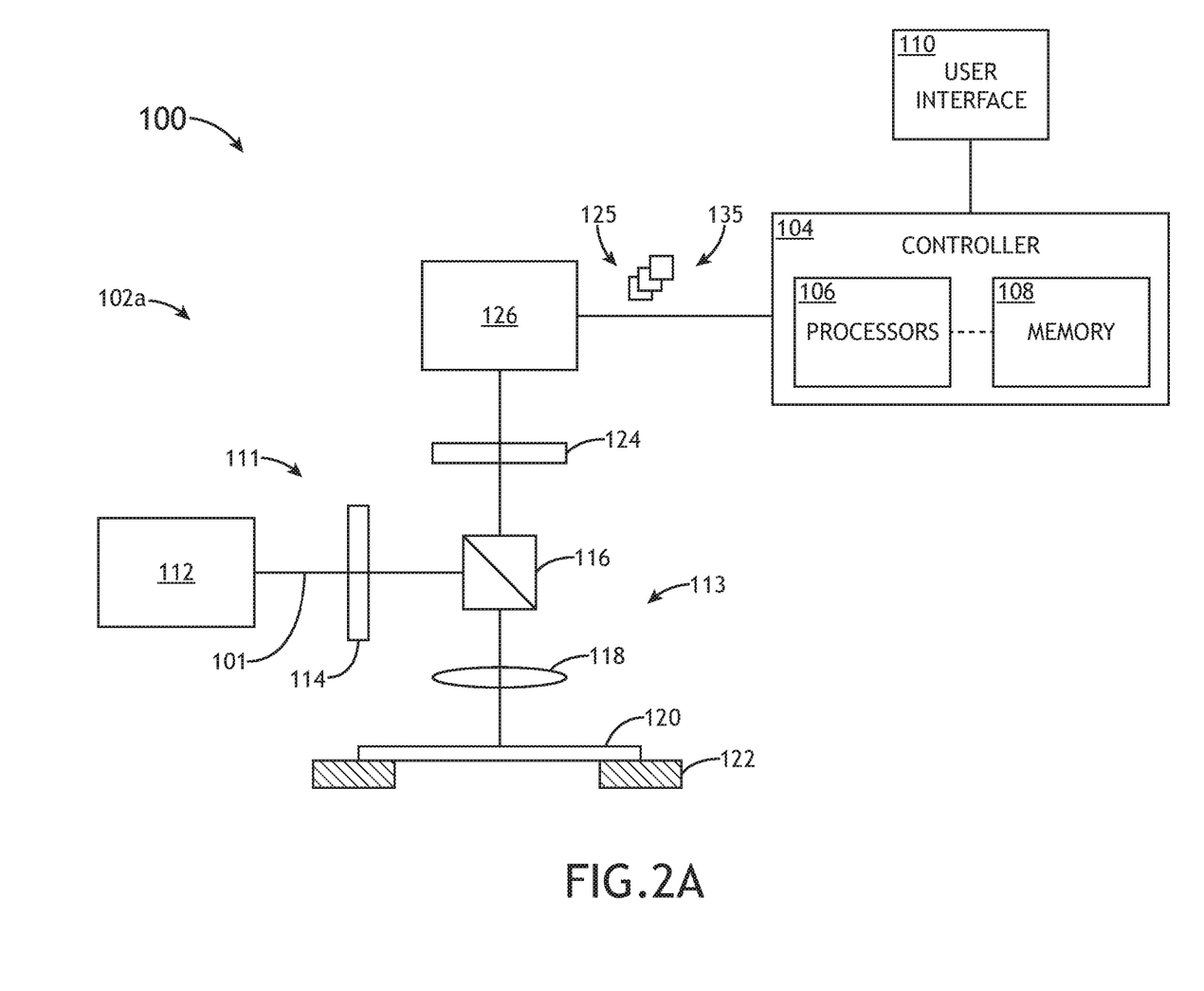
FIG. 2A illustrates a system for determining defects using physics-based image perturbations, in accordance with one or more embodiments of the present disclosure.

FIG. 2A illustrates a simplified schematic view of the system 100 for characterizing a specimen, in accordance with one or more embodiments of the present disclosure. In particular, the system 100 as depicted in FIG. 2A includes an optical inspection sub-system 102 such that system 100 operates as an optical inspection system.

The optical inspection sub-system 102a may include any optical-based inspection known in the art. For example, the inspection sub-system 102a may include an optical darkfield inspection tool. The optical inspection sub-system 102a may include, but is not limited to, an illumination source 112, an illumination arm 111, a collection arm 113, and a detector assembly 126.

In one embodiment, optical inspection sub-system 102a is configured to inspect and/or measure the specimen 120 disposed on the stage assembly 122. Illumination source 112 may include any illumination source known in the art for generating illumination 101 including, but not limited to, a broadband radiation source. In another embodiment, optical inspection sub-system 102a may include an illumination arm 111 configured to direct illumination 101 to the specimen 120. It is noted that illumination source 112 of optical inspection sub-system 102a may be configured in any orientation known in the art including, but not limited to, a dark-field orientation, a light-field orientation, and the like. For example, one or more optical elements 114, 124 may be selectably adjusted in order to configure the inspection sub-system 102a in a dark-field orientation, a bright-field orientation, and the like.

Specimen 120 may include any specimen known in the art including, but not limited to, a wafer, a reticle, a photomask, and the like. In one embodiment, specimen 120 is disposed on a stage assembly 122 to facilitate movement of specimen 120. In another embodiment, the stage assembly 122 is an actuatable stage. For example, the stage assembly 122 may include, but is not limited to, one or more translational stages suitable for selectably translating the specimen 120 along one or more linear directions (e.g., x-direction, y-direction and/or z-direction). By way of another example, the stage assembly 122 may include, but is not limited to, one or more rotational stages suitable for selectively rotating the specimen 120 along a rotational direction. By way of another example, the stage assembly 122 may include, but is not limited to, a rotational stage and a translational stage suitable for selectably translating the specimen 120 along a linear direction and/or rotating the specimen 120 along a rotational direction. It is noted herein that the system 100 may operate in any scanning mode known in the art.

The illumination arm 111 may include any number and type of optical components known in the art. In one embodiment, the illumination arm 111 includes one or more optical elements 114, a set of one or more optical elements 115, a beam splitter 116, and an objective lens 118. In this regard, illumination arm 111 may be configured to focus illumination 101 from the illumination source 112 onto the surface of the specimen 120. The one or more optical elements 114 may include any optical elements known in the art including, but not limited to, one or more mirrors, one or more lenses, one or more polarizers, one or more beam splitters, wave plates, and the like.

In another embodiment, optical inspection sub-system 102a includes a collection arm 113 configured to collect illumination reflected or scattered from specimen 120. In another embodiment, collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, wave plates, and the like. It is noted that detector assembly 126 may include any sensor and detector assembly known in the art for detecting illumination reflected or scattered from the specimen 120.

In another embodiment, the detector assembly 126 of the optical inspection sub-system 102 is configured to collect inspection data of the specimen 120 based on illumination reflected or scattered from the specimen 120. In another embodiment, the detector assembly 126 is configured to transmit collected/acquired images and/or metrology data to the controller 104.

As noted previously herein, the controller 104 of system 100 may include one or more processors 106 and memory 108. The memory 108 may include program instructions configured to cause the one or more processors 106 to carry out various steps of the present disclosure. In one embodiment, the program instructions are configured to cause the one or more processors 106 to adjust one or more characteristics of the optical inspection sub-system 102 in order to perform one or more measurements of the specimen 120.

In additional and/or alternative embodiments, the inspection sub-system 102 may include a charged particle-based inspection sub-system 102. For example, the inspection sub-system 102 may include an SEM characterization sub-system, as illustrated in FIG. 2B.

Figure 2B:
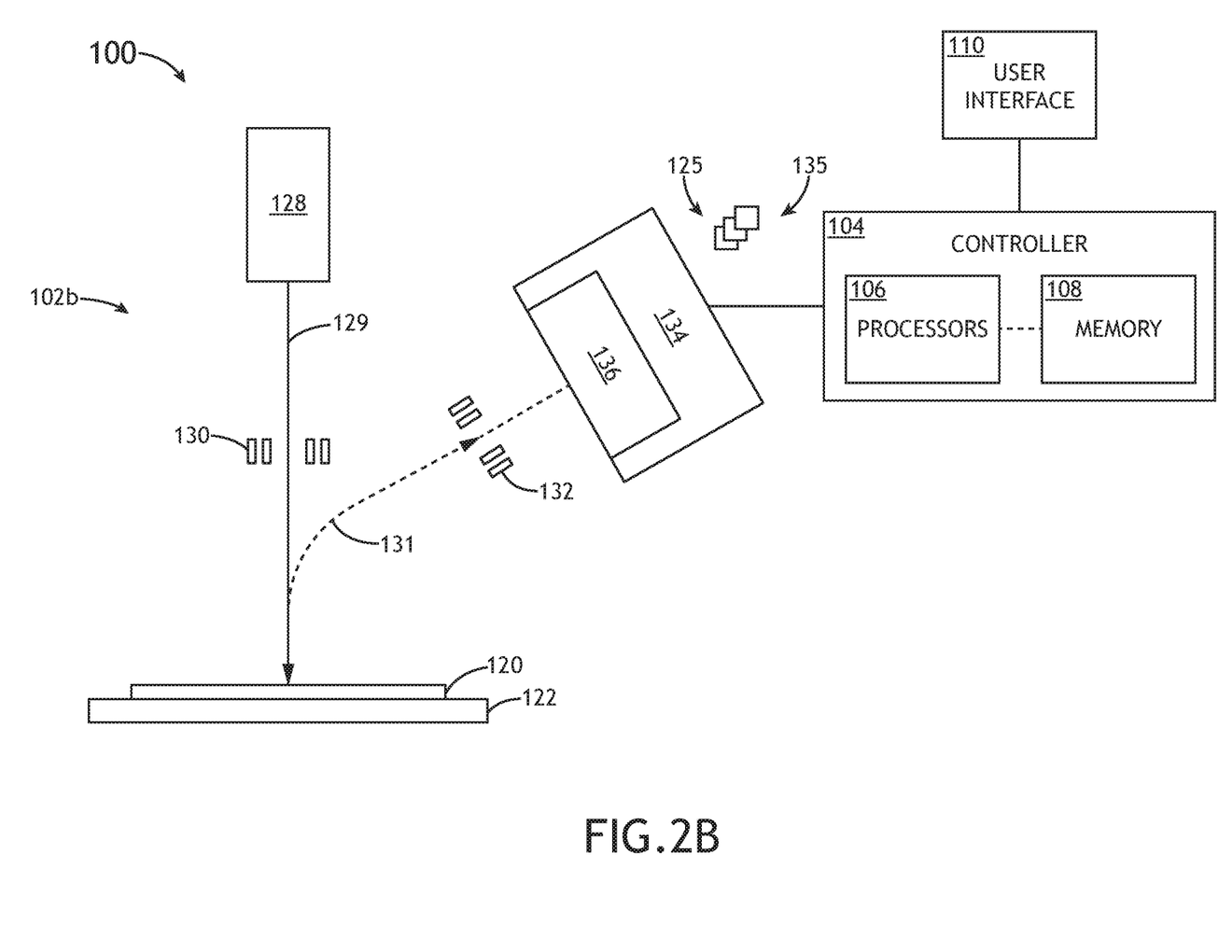
FIG. 2B illustrates a system for determining defects using physics-based image perturbations, in accordance with one or more embodiments of the present disclosure.

FIG. 2B illustrates a simplified schematic view of the system 100 for characterizing a specimen 120, in accordance with one or more embodiments of the present disclosure. In particular, the system 100 as depicted in FIG. 2B, includes an electron-base sub-system 102b such that system 100 operates as electron-based inspection system.

In one embodiment, the electron-based inspection sub-system 102b is configured to perform one or more measurements on the specimen 120. In this regard, the electron-based inspection sub-system 102b may be configured to acquire one or more images of the specimen 120. The electron-based inspection sub-system 102b may include, but is not limited to, electron beam source 128, one or more electron-optical elements 130, one or more electron-optical elements 132, and an electron detector assembly 134 including one or more electron sensors 136.

In one embodiment, the electron beam source 128 is configured to direct one or more electron beams 129 to the specimen 120. The electron beam source 128 may form an electron-optical column. In another embodiment, electron beam source 128 includes one or more additional and/or alternative electron-optical elements 130 configured to focus and/or direct the one or more electron beams 129 to the surface of the specimen 120. In another embodiment, electron-based inspection sub-system 102b includes one or more electron-optical elements 132 configured to collect secondary and/or backscattered electrons 131 emanated from the surface of the specimen 120 in response to the one or more electron beams 129. It is noted herein that the one or more electron-optical elements 130 and the one or more electron-optical elements 132 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the electron-based inspection sub-system 102b is not limited to the electron-optical elements depicted in FIG. 2B, which are provided merely for illustrative purposes. It is further noted that the system 100 may include any number and type of electron-optical elements necessary to direct/focus the one or more electron beams 129 onto the specimen 120 and, in response, collect and image the emanated secondary and/or backscattered electrons 131 onto the electron detector assembly 134.

For example, the system 100 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 129 relative to the surface of the specimen 120. Further, the one or more scanning elements may be utilized to scan the one or more electron beams 129 across the specimen 120 in a selected pattern.

In another embodiment, secondary and/or backscattered electrons 131 are directed to one or more sensors 136 of the electron detector assembly 134. The electron detector assembly 134 of the electron-based inspection sub-system 102 may include any electron detector assembly known in the art suitable for detecting backscattered and/or secondary electrons 131 emanating from the surface of the specimen 120. In one embodiment, the electron detector assembly 134 includes an electron detector array. In this regard, the electron detector assembly 134 may include an array of electron-detecting portions. Further, each electron-detecting portion of the detector array of the electron detector assembly 134 may be positioned so as to detect an electron signal from specimen 120 associated with one of the incident one or more electron beams 129. The electron detector assembly 134 may include any type of electron detector known in the art. For example, the electron detector assembly 134 may include a micro-channel plate (MCP), a PIN or p-n junction detector array, such as, but not limited to, a diode array or avalanche photo diodes (APDs). By way of another example, the electron detector assembly 134 may include a high-speed scintillator or a photomultiplier tube (PMT) detector.

While FIG. 2B illustrates the electron-based inspection sub-system 102b as including an electron detector assembly 134 comprising only a secondary electron detector assembly, this is not to be regarded as a limitation of the present disclosure. In this regard, it is noted that the electron detector assembly 134 may include, but is not limited to, a secondary electron detector, a backscattered electron detector, and/or a primary electron detector (e.g., an in-column electron detector). In another embodiment, electron-based inspection sub-system 102 may include a plurality of electron detector assemblies 134. For example, system 100 may include a secondary electron detector assembly 134a, a backscattered electron detector assembly 134b, and an in-column electron detector assembly 134c.

In another embodiment, as described previously herein, the system 100 includes a user interface 110 communicatively coupled to the controller 104. In another embodiment, the user interface 110 includes a user input device and a display. The user input device of the user interface 110 may be configured to receive one or more input commands from a user, the one or more input commands configured to input data into system 100 and/or adjust one or more characteristics of system 100. In another embodiment, the display of the user interface 110 may be configured to display data of system 100 to a user.

In one embodiment, the one or more processors 106 may be communicatively coupled to memory 108, wherein the one or more processors 106 are configured to execute a set of program instructions stored on memory 108, the set of program instructions configured to cause the one or more processors 106 to carry out various functions and steps of the present disclosure. In this regard, the controller 104 may be configured to: receive one or more training images 125 of one or more defects of a training specimen 120 from the inspection sub-system 102; generate one or more augmented images of the one or more defects of the training specimen 120; generate a machine learning classifier based on the one or more augmented images; receive one or more target images 135 of one or more target features of a target specimen from the inspection sub-system 102; determine one or more defects of the one or more target features using the machine learning classifier. Each of these steps/functions of the controller 104 will each be described in further detail herein.

It is noted herein that the one or more components of system 100 may be communicatively coupled to the various other components of system 100 in any manner known in the art. For example, the one or more processors 106 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 104 may be communicatively coupled to one or more components of inspection sub-system 102 via any wireline or wireless connection known in the art.

In one embodiment, the one or more processors 106 may include any one or more processing elements known in the art. In this sense, the one or more processors 106 may include any microprocessor-type device configured to execute software algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 106. In general, the term "processor" may be broadly defined to encompass any device having one or more processing elements, which execute program instructions from memory 108. Moreover, different subsystems of the system 100 (e.g., illumination source 112, electron beam source 128, detector assembly 126, electron detector assembly 134, controller 104, user interface 110, and the like) may include processor or logic elements suitable for carrying out at least a portion of the steps described throughout the present disclosure. Therefore, the above description should not be interpreted as a limitation on the present disclosure but merely an illustration.

The memory 108 may include any storage medium known in the art suitable for storing program instructions executable by the associated one or more processors 106 and the data received from the inspection sub-system 102. For example, the memory 108 may include a non-transitory memory medium. For instance, the memory 108 may include, but is not limited to, a read-only memory (ROM), a random-access memory (RAM), a magnetic or optical memory device (e.g., disk), a magnetic tape, a solid-state drive and the like. It is further noted that memory 108 may be housed in a common controller housing with the one or more processors 106. In an alternative embodiment, the memory 108 may be located remotely with respect to the physical location of the processors 106, controller 104, and the like. In another embodiment, the memory 108 maintains program instructions for causing the one or more processors 106 to carry out the various steps described through the present disclosure.

In one embodiment, a user interface 110 is communicatively coupled to the controller 104. In one embodiment, the user interface 110 may include, but is not limited to, one or more desktops, tablets, smartphones, smart watches, or the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110.

Figure 3:
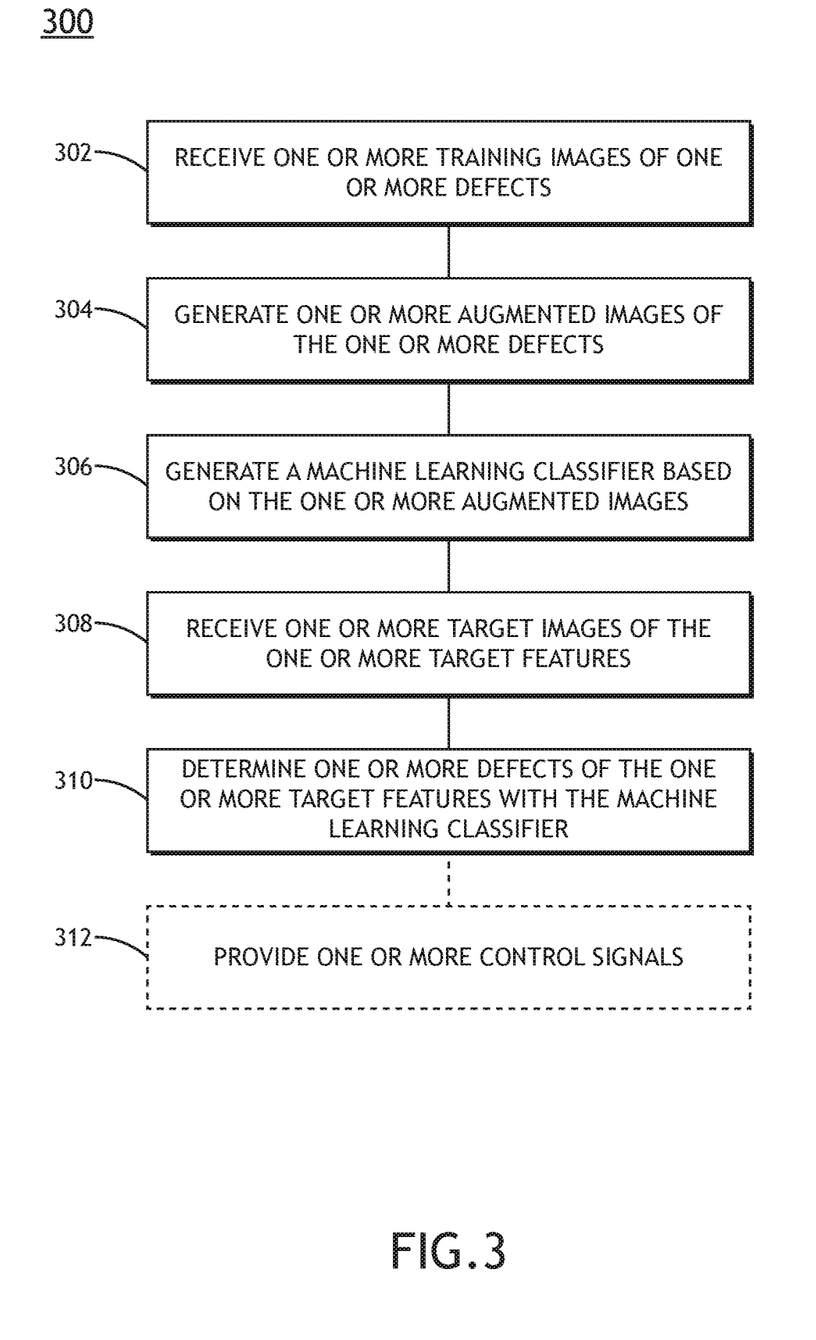
FIG. 3 illustrates a flowchart illustrating the steps of a method of determining defects using physics-based image perturbations, in accordance with one or more embodiments of the present disclosure.

FIG. 3 illustrates a method 300 for determining one or more defects of one or more target features of a specimen 120, in accordance with one or more embodiments of the present disclosure. In particular, FIG. 3 illustrates a method 300 for determining one or more defects using image processing and machine learning techniques. In this regard, FIG. 3 is a conceptual flowchart illustrating steps of method 300, as may be performed by/within the one or more processors 106 of the controller 104.

In step 302, one or more training images of one or more defects are received. For example, the one or more training images of the one or more defects may be received by the controller 104 from the optical inspection sub-system 102a. By way of another example, the controller 104 may receive one or more electron-based (e.g., SEM) training images 125 of the one or more defects of a training specimen 120 from the electron-based inspection sub-system 102. In this regard, the training images 125 may include an optical training image 125, an electron-based training image 125, and the like. In additional and/or alternative embodiments, the controller 104 may be configured to receive one or more training images 125 from a source other than the one or more inspection sub-systems 102. For example, the controller 104 may be configured to receive one or more training images 125 of features of a specimen 120 from an external storage device and/or memory 108. In another embodiment, controller 104 may be further configured to store received training images 125 in memory 108.

In step 304, one or more augmented images of the one or more defects of the training specimen 120 are generated. In one embodiment, the generating one or more augmented images of the one or more defects of the training specimen 120 includes causing the controller 104 to: generate one or more perturbed images by introducing one or more physical perturbations to the one or more training images 125; determining one or more features of the training specimen 120 indicative of one or more defects of the training specimen 120 based on the one or more perturbed images; and extracting the one or more features of the training specimen 120 indicative of the one or more defects of the training specimen 120 to generate one or more replicas of the one or more defects of the training specimen 120.

For example, the one or more physical perturbations may include any physical perturbation that may affect one or more characteristics of the one or more defects of the training specimen 120. In this regard, the one or more physical perturbations may include any perturbation that may result from a generation of system noise within the characterization sub-system 102. It is expressly contemplated that the embodiments of the present disclosure are not limited to receiving one or more training images and only subsequently generating one or more augmented images. For example, the controller 104 may be configured to analyze one or more characteristics the training specimen 120 based on the perturbed images received from the detector assembly 126 and/or the electron detector assembly 134 and subsequently modify one or more characteristics of system 100 based on the perturbed images. In this regard, the controller 104 may cause one or more physical perturbations (e.g., noise generation) to be introduced to the characterization sub-system 102 such that one or more perturbed images are generated.

As an additional example, the controller 104 may be configured to extract the one or more features of the training specimen 120 indicative of the one or more defects of the training specimen. For example, the controller 104 may extract data from the perturbed images related to one or more attributes of a defect (e.g., any attribute which may be of interest and which may suggest the presence of a defect of a specimen, including, without limitation, specimen material or topographic irregularities). In this regard, the controller 104 may be configured to identify one or more defective pixels from the perturbed images, wherein the one or more pixels contain the attributes of a defect as they appear on the specimen. The controller 104 may be configured to store the data from the perturbed images in memory 108. In another embodiment, the controller 104 may be configured to generate one or more replicas of the one or more defects (e.g., optical images that include the extracted defects corresponding to the one or more features indicative of one or more defects of a specimen). For example, the one or more replicas may include material information or specimen topography information which may enable the generation of a more sophisticated, deep-learning predictive model configured to determine one or more defects of a specimen. In some embodiments, the one or more replicas may be stored in memory 108 such that the controller 104 may receive and/or retrieve the digital replicas from memory 108. By way of another example, the one or replicas may comprise images that include the one or more pixels identified in the perturbed images. In some embodiments, the one or more replicas may comprise images containing the one or more pixels, wherein one or more aspects of the one or more pixels have been modified to assist the deep-learning predictive model in determining one or more defects of a specimen.

In step 306, a machine learning classifier is generated based on the one or more augmented images. For example, the controller 104 may be configured to generate a machine learning classifier based on the one or more augmented images and/or the one or more replicas. The controller 104 may be configured to generate the machine learning classifier via any one or more techniques known in the art, including, without limitation, supervised learning, unsupervised learning, and the like.

For example, in the context of supervised learning, the augmented images may include images of defects with known sizes and/or known defect types. In this regard, the controller 104 may receive one or more known defect type classifications and/or one or more known defect sizes associated with the defects depicted in the augmented images. Accordingly, the augmented images, known defect type classifications, and known defect sizes may be used as inputs to train the machine learning classifier. Known defect type classifications may include classifications for any type of defect known in the art including, but not limited to, a pin-hole defect classification, a resist-dot defect classification, a scratch defect classification, a fast-localized defect classification, and the like. The controller 104 may be further configured to store known defect type classifications, known defect sizes, and the generated machine learning classifier in memory 108.

It is further noted herein that the machine learning classifier generated in step 306 may include any type of machine learning algorithm/classifier and/or deep learning technique or classifier known in the art including, but not limited to, a random forest classifier, a support vector machine (SVM) classifier, an ensemble learning classifier, an artificial neural network (ANN), and the like. By way of another example, the machine learning classifier may include a deep convolutional neural network (CNN). For instance, in some embodiments, the machine learning classifier may include ALEXNET and/or GOOGLENET. In this regard, the machine learning classifier may include any algorithm, classifier, or predictive model configured to determine types of defects within the augmented images.

In step 308, one or more target images of the one or more target features are received. In one embodiment, the controller 104 may be configured to receive one or more target images 135 from the inspection sub-system 102. As it is used herein, the term "target images" may be used to refer to images of defects for which the defect is to be determined. Thus, "target images" may be distinguished from "training images," which may be regarded as images of defects which will be used as inputs to train a machine learning classifier.

It is noted herein that any discussion regarding the acquisition of training images 125 may be regarded as applying to the acquisition of target images 135, unless noted otherwise herein. Accordingly, the target images 135 may be received from the optical inspection sub-system 102a and/or the electron-based inspection sub-system 102b. In this regard, the target images 135 may include an optical target image 135, an electron-based target image 135, and the like. In additional and/or alternative embodiments, the controller 104 may be configured to receive one or more target images 135 from a source other than the one or more inspection sub-systems 102. For example, the controller 104 may be configured to receive one or more target images 135 of a specimen 120 from an external storage device and/or memory 108.

In step 310, one or more defects of the one or more target features are determined. The one or more defects of the target specimen may include any type of defect which may be of interest throughout a specimen fabrication/characterization process including, without limitation, a pin-hole defect, a resist-dot defect, a scratch, a fast-localized defect, and the like. In some embodiments, the controller 104 is configured to determine one or more defect type classifications of the one or more defects within a target image 135 with the generated machine learning classifier. For example, the controller 104 may receive target image 135 depicting a pin-hole defect of the specimen. In this example, the controller 104 may be configured to determine that the target image 135a includes a pin-hole defect, and associate the defect with a pin-hole defect type classification. By way of another example, the controller 104 may receive a target image 135 depicting a scratch defect of the specimen, determine that the target image 135 includes a scratch defect, and associate the defect with a scratch defect type classification. In some embodiments, the controller 104 may be directed to determine only defects of a certain type. For example, the controller 104 may receive a defect type selection, which selection may direct the controller 104 to determine the presence of only the specific defect type(s) selected. The defect type selection may be provided to the controller by a user via the user interface 110. In another embodiment, the defect type selection may be provided to the controller 104 in the form of a prioritization scheme, wherein defect types are prioritized according to a scheme, and the controller 104 is configured to prioritize the determination of a given defect type over the determination of another defect type. The prioritization scheme may be provided by a user via the user interface 110, and may be stored in memory 108. In another embodiment, the defect type selection may be provided by the machine learning classifier based on one of more attributes of the selected defect type. For example, the machine learning classifier may be configured to determine that one or more defect types exist on a specimen with greater frequency than one or more other defect types, and may provide a defect type selection that prioritizes the determination of the defect type occurring more frequently.

In step 312, one or more control signals are provided. For example, one or more control signals for adjusting one or more process tools (e.g., lithographic tools) are provided. As an additional example, the controller 104 may provide one or more control signals (or corrections to the control signals) to one or more portions of one or more process tools for adjusting the one or more parameters (e.g., fabrication settings, configuration, and the like) of the one or more process tools such that one or more parameters of the one or more process tools are adjusted. The controller 104 may determine the one or more control signals based on the one or more determined defects of the target specimen. The control signals (or corrections to the control signals) may be provided by the controller 104 as part of a feedback and/or feedforward control loop. The controller 104 may cause the one or more process tools to execute one or more adjustments to the one or more parameters of the process tools based on the control signals, or the controller 104 may alert a user to make the one or more adjustments to the one or more parameters. In this sense, the one or more control signals may compensate for errors of one or more fabrication processes of the one or more process tools, and thus may enable the one or more process tools to maintain overlay within selected tolerances across multiple exposures on subsequent samples in the same or different lots.

Figure 4:
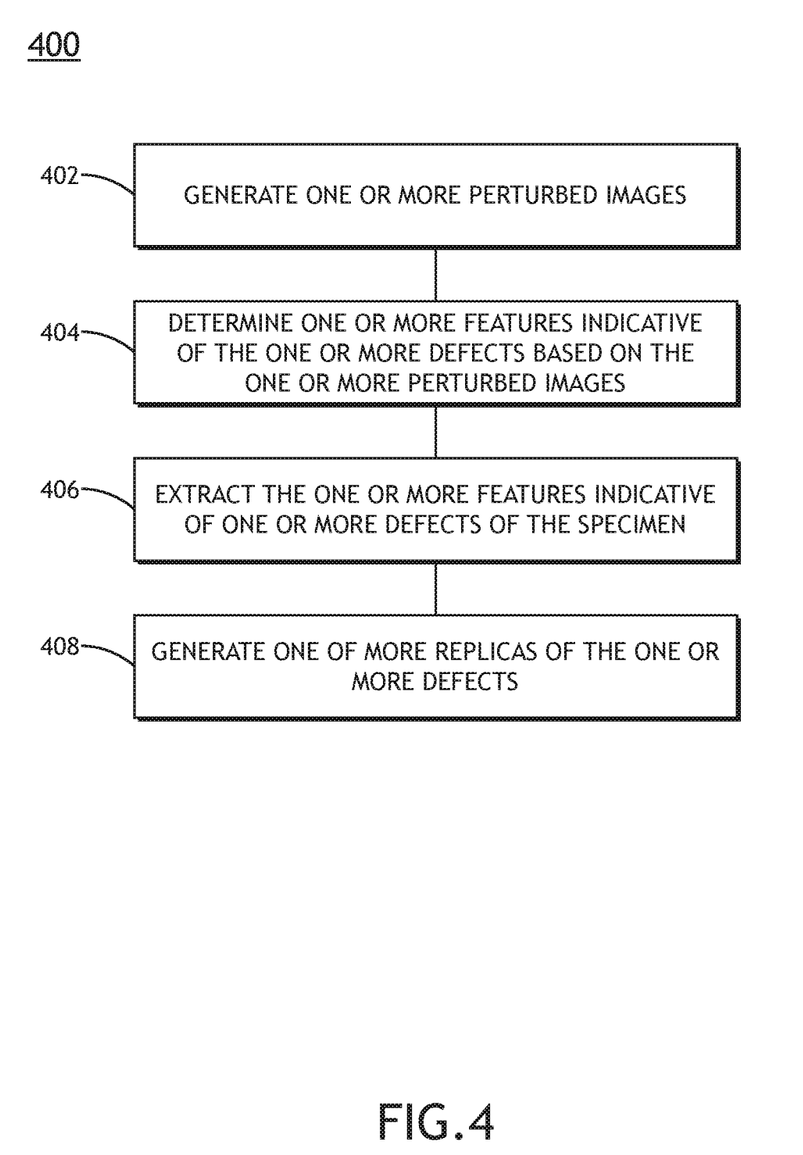
FIG. 4 illustrates a flowchart illustrating the steps of a method of determining defects using physics-based image perturbations, in accordance with one or more embodiments of the present disclosure.

FIG. 4 illustrates a method 400 for determining one or more defects of a specimen, in accordance with one or more embodiments of the present disclosure. In particular, FIG. 4 illustrates a method 400 for generating one or more augmented images through the generation of one or more perturbed images. In this regard, FIG. 4 is a conceptual flowchart illustrating steps of method 400, as may be performed by/within the one or more processors 106 of the controller 104.

In step 402, one or more perturbed images are generated. For example, the controller 104 may cause one or more physical perturbations to be introduced to one or more training images and/or the characterization sub-system 102. The one or more physical perturbations may include any physical perturbation that may affect one or more characteristics of an image of the one or more defects of the training specimen 120, including, without limitation, noise generation. In this regard, the controller 104 may cause one or more physical perturbations to be introduced to the characterization sub-system 102 such that one or more perturbed images are generated.

In step 404, one or more features indicative of the one or more defects of the specimen are determined based on the one or more perturbed images. The one or more features indicative of the one or more defects of the specimen may include any attribute of interest and which may suggest the presence of a defect, including, without limitation, abnormalities and/or irregularities in specimen material and/or topography. The controller 104 may be configured to analyze the one or more perturbed images to determine the one or more features indicative of the one or more defects. The controller 104 may be configured to determine the one or more features indicative of the one or more defects by comparing data from the one or more perturbed images to data stored in memory, including, without limitation, design files.

In step 406, one or more features indicative of one or more defects of the specimen are extracted. For example, the controller 104, after identifying one or more features indicative of the one or more defects of the specimen, extract data from the perturbed images related to one or more attributes of a defect (e.g., any attribute which may be of interest and which may suggest the presence of a defect of a specimen, including, without limitation, specimen material or topographic irregularities). In this regard, the controller 104 may be configured to identify one or more defective pixels from the perturbed images, wherein the one or more pixels contain the attributes of a defect as they appear on the specimen. The controller 104 may be configured to store the data from the perturbed images in memory 108.

In step 408, one or more replicas of the one or more defects are generated. For example, the controller 104 may be configured to generate one or more replicas of the one or more defects (e.g., optical images that include the extracted defects corresponding to the one or more features indicative of one or more defects of a specimen) based on the one or more perturbed images. As an additional example, the one or more replicas may include material information or specimen topography information which may enable the generation of a more sophisticated, deep-learning predictive model configured to determine one or more defects of a specimen. In some embodiments, the one or more replicas may be stored in memory 108 such that the controller 104 may receive and/or retrieve the replicas from memory 108. By way of another example, the one or replicas may comprise images that include the one or more pixels extracted from the perturbed images. In some embodiments, the one or more replicas may comprise images containing the one or more pixels, wherein one or more aspects of the one or more pixels have been modified to assist the deep-learning predictive model in determining one or more defects of a specimen.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:
    a controller having one or more processors configured to execute a set of program instructions stored in memory, the set of program instructions configured to cause the one or more processors to:
        receive one or more training images of one or more defects of a training specimen;
        select one or more defect types from the one or more defects for augmentation based on the frequency of the defect types in the one or more training images;
        generate one or more augmented images of the one or more defects of the training specimen, wherein the one or more processors selects one or more defect types for augmentation based on the frequency of defect types in the one or more training images;
        generate a machine learning classifier based on the one or more augmented images of the one or more defects of the training specimen;
        receive one or more target images of one or more target features of a target specimen; and
        determine one or more defects of the one or more target features with the machine learning classifier.

2. The system of claim 1, wherein generating one or more augmented images of the one or more defects of the training specimen comprises causing the one or more processors to:
    generate one or more perturbed images by introducing one or more physical perturbations to the one or more training images;
    determine one or more features of the training specimen indicative of the one or more defects based on the one or more perturbed images; and
    extract the one or more features indicative of one or more defects of the specimen to generate one or more replicas of the one or more defects.

3. The system of claim 2, wherein the one or more physical perturbations comprise noise generation.

4. The system of claim 1, wherein determining one or more defects of the one or more target features with the machine learning classifier comprises causing the one or more processors to:
    receive a defect type selection, wherein the defect type selection instructs the machine learning classifier to determine one or more defects that correspond to the defect type selection.

5. The system of claim 4, wherein the defect type selection is provided by a user via a user interface.

6. The system of claim 4, wherein the defect type selection is determined by the one or more processors based on one or more defect type prioritization schemes.

7. The system of claim 4, wherein the defect type selection is provided by the machine learning classifier based on one or more defect frequencies.

8. The system of claim 1, wherein the machine learning classifier comprises at least one of a deep learning classifier, a convolutional neural network (CNN), an ensemble learning classifier, a random forest classifier, or an artificial neural network.

9. The system of claim 1, wherein the set of program instructions is further configured to cause the one or more processors to:
    provide one or more control signals to one or more process tools.

10. A system, comprising:
    a characterization sub-system configured to acquire one or more images of a specimen; and
    a controller including one or more processors configured to execute a set of program instructions stored in memory, the set of program instructions configured to cause the one or more processors to:
        receive from the characterization sub-system one or more training images of one or more defects of a training specimen;
        generate one or more augmented images of the one or more defects of the training specimen, wherein the one or more processors selects one or more defect types for augmentation based on the frequency of defect types in the one or more training images;
        generate a machine learning classifier based on the one or more augmented images of the one or more defects of the training specimen;
        receive from the characterization sub-system one or more target images of one or more target features of a target specimen; and
        determine one or more defects of the one or more target features with the machine learning classifier.

11. The system of claim 10, wherein generating one or more augmented images based on the one or more defects of the training specimen comprises:
    generating one or more perturbed images by introducing one or more physical perturbations to the one or more training images;

determining one or more features of the training specimen indicative of the one or more defects based on the one or more perturbed images; and extracting the one or more features indicative of one or more defects of the specimen to generate one or more replicas of the one or more defects.

12. The system of claim 11, wherein the one or more physical perturbations comprise noise generation.

13. The system of claim 10, wherein determining one or more defects of the one or more target features with the machine learning classifier comprises:

receiving a defect type selection, wherein the defect type selection instructs the machine learning classifier to determine one or more defects that correspond to the defect type selection.

14. The system of claim 13, wherein the defect type selection is provided by a user via a user interface.

15. The system of claim 13, wherein the defect type selection is determined by the one or more processors based on one or more defect type prioritization schemes.

16. The system of claim 13, wherein the defect type selection is provided by the machine learning classifier based on one or more defect frequencies.

17. The system of claim 10, wherein the characterization sub-system comprises at least one of an electron-based inspection sub-system or an optical-based inspection sub-system.

18. The system of claim 10, wherein the characterization sub-system comprises at least one of a broadband inspection sub-system or a narrowband inspection sub-system.

19. The system of claim 10, wherein the machine learning classifier comprises at least one of a deep learning classifier, a convolutional neural network (CNN), an ensemble learning classifier, a random forest classifier, or an artificial neural network.

20. The system of claim 10, wherein the set of program instructions is further configured to cause the one or more processors to:

provide one or more control signals to one or more process tools.

21. A method, comprising:

receiving one or more training images of one or more defects of a training specimen;

selecting one or more defect types for augmentation based on the frequency of defect types in the one or more training images;

generating one or more augmented images of the one or more defects of the training specimen based on the selected one or more defect types;

generating a machine learning classifier based on the one or more augmented images of the one or more defects of the training specimen;

receiving one or more target images of one or more target features of a target specimen; and determining one or more defects of the one or more target features with the machine learning classifier.

22. The method of claim 21, wherein generating one or more augmented images of the one or more defects of the training specimen comprises:

generating one or more perturbed images by introducing one or more physical perturbations to the one or more training images;

determining one or more features of the training specimen indicative of the one or more defects based on the one or more perturbed images; and extracting the one or more features indicative of one or more defects of the specimen to generate one or more replicas of the one or more defects.

23. The method of claim 21, wherein determining one or more defects of the one or more target features with the machine learning classifier comprises:

receiving a defect type selection, wherein the defect type selection instructs the machine learning classifier to determine one or more defects that correspond to the defect type selection.

24. The method of claim 21, further comprising:

providing one or more control signals to one or more process tools.

* * * * *